United States Patent
Leseman et al.

(10) Patent No.: US 7,905,947 B2
(45) Date of Patent: Mar. 15, 2011

(54) METHOD AND APPARATUS FOR REMOVING CONTAMINATES FROM AIR

(75) Inventors: Gary T. Leseman, Houston, TX (US); Joseph B. Davis, Sugarland, TX (US)

(73) Assignee: L.C. Eldridge Sales Co., Ltd., Houston, TX (US)

( * ) Notice: Subject to any disclaimer, the term of this patent is extended or adjusted under 35 U.S.C. 154(b) by 441 days.

(21) Appl. No.: 11/753,492

(22) Filed: May 24, 2007

(65) Prior Publication Data
US 2007/0294985 A1    Dec. 27, 2007

Related U.S. Application Data

(60) Provisional application No. 60/802,774, filed on May 24, 2006.

(51) Int. Cl.
*B01D 46/00* (2006.01)

(52) U.S. Cl. ............... 95/273; 55/282; 55/305; 55/428; 55/433; 55/410; 55/418; 55/420; 55/423; 55/478; 55/481; 55/DIG. 17; 55/DIG. 37; 95/11; 95/12; 95/22; 95/23; 95/287; 96/399; 96/400; 96/401; 96/422; 96/233

(58) Field of Classification Search ............ 55/282–305, 55/428–433, 410, 413–418, 420, 423, 478–481, 55/DIG. 17, DIG. 37; 95/11–12, 22–23, 95/273–287; 96/399, 400–401, 422, 417, 96/233
See application file for complete search history.

(56) References Cited

U.S. PATENT DOCUMENTS

| | | | | |
|---|---|---|---|---|
| 2,942,691 A | * | 6/1960 | Dillon | 55/426 |
| 3,234,716 A | * | 2/1966 | Sevin et al. | 210/360.1 |
| 3,348,466 A | | 10/1967 | Lane et al. | |
| 3,358,580 A | | 12/1967 | Freese et al. | |
| 3,380,810 A | * | 4/1968 | Hamblin | 422/176 |
| 3,771,430 A | | 11/1973 | Lane | |
| 3,953,183 A | | 4/1976 | Regehr | |
| 4,043,319 A | * | 8/1977 | Jensen | 126/299 D |
| 4,113,454 A | * | 9/1978 | Cvacho | 55/319 |
| 4,127,106 A | * | 11/1978 | Jensen | 126/299 D |
| 4,969,936 A | * | 11/1990 | Schweigert et al. | 96/129 |
| 4,999,927 A | * | 3/1991 | Durst et al. | 34/448 |
| 5,542,224 A | | 8/1996 | Olsen | |
| 5,562,746 A | * | 10/1996 | Raether | 55/302 |

(Continued)

OTHER PUBLICATIONS

Camfil Farr, "ECO Moisture Separator" [retrieved from the Internet on 2208-01-29 using <URL: http://www.camfilfarr.com/cou_us/products/medeff/Eco_Moisture_Separator.cfm>.

*Primary Examiner* — Jason M Greene
*Assistant Examiner* — Dung Bui
(74) *Attorney, Agent, or Firm* — Locke Lord Bissell & Liddell LLP

(57) ABSTRACT

A filter assembly comprising a housing having an air inlet and an air outlet and a filter chamber disposed between the inlet and the outlet, the housing having an air flow path there through. A filter element having a first surface area maybe located within the filter chamber and oriented such that the first surface area is angled with respect to the air flow path. The filter element may comprise a filter media adapted to remove contaminants from the air. A drain may be associated with the housing and adapted to remove contaminants filtered out of the air.

23 Claims, 5 Drawing Sheets

U.S. PATENT DOCUMENTS

| | | | |
|---|---|---|---|
| 5,662,097 A * | 9/1997 | Panos | 126/299 E |
| 5,733,350 A * | 3/1998 | Muller et al. | 55/482 |
| 5,743,925 A * | 4/1998 | Bench | 96/421 |
| 5,839,244 A | 11/1998 | Johnson et al. | |
| 6,010,547 A * | 1/2000 | Jeong et al. | 55/282.3 |
| 6,099,612 A * | 8/2000 | Bartos | 55/481 |
| 6,129,781 A * | 10/2000 | Okamoto et al. | 96/25 |
| 6,447,566 B1 * | 9/2002 | Rivera et al. | 55/482 |
| 6,485,538 B1 * | 11/2002 | Toyoshima | 55/490 |
| 6,585,790 B2 * | 7/2003 | Linnersten et al. | 55/319 |
| 6,808,547 B2 * | 10/2004 | Ota et al. | 55/478 |
| 6,955,696 B1 * | 10/2005 | Ost et al. | 55/357 |
| 7,041,146 B2 * | 5/2006 | Bugli et al. | 55/481 |
| 7,097,683 B2 * | 8/2006 | Eppel et al. | 55/423 |
| 7,252,696 B2 * | 8/2007 | Jenkins et al. | 55/481 |
| 7,364,602 B2 * | 4/2008 | Wu et al. | 55/493 |
| 7,410,520 B2 * | 8/2008 | Nowak et al. | 55/482 |
| 7,588,615 B2 * | 9/2009 | Gillenberg et al. | 55/423 |
| 2003/0159586 A1 * | 8/2003 | Seguin et al. | 96/129 |
| 2004/0144254 A1 * | 7/2004 | Wiser et al. | 96/66 |
| 2005/0115879 A1 * | 6/2005 | Kochergin et al. | 210/193 |
| 2005/0166559 A1 * | 8/2005 | Gillingham et al. | 55/481 |
| 2005/0223719 A1 * | 10/2005 | Killion et al. | 62/93 |
| 2006/0016163 A1 * | 1/2006 | O'Connor et al. | 55/481 |
| 2007/0074495 A1 * | 4/2007 | Morgan et al. | 55/478 |
| 2008/0250763 A1 * | 10/2008 | Widerski et al. | 55/357 |

\* cited by examiner

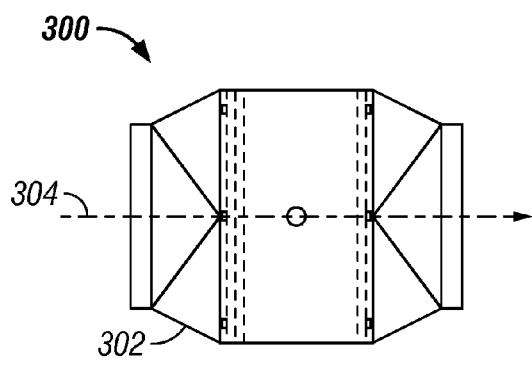
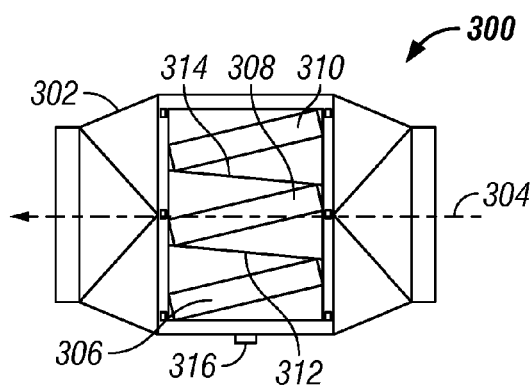
FIG. 3A  FIG. 3B
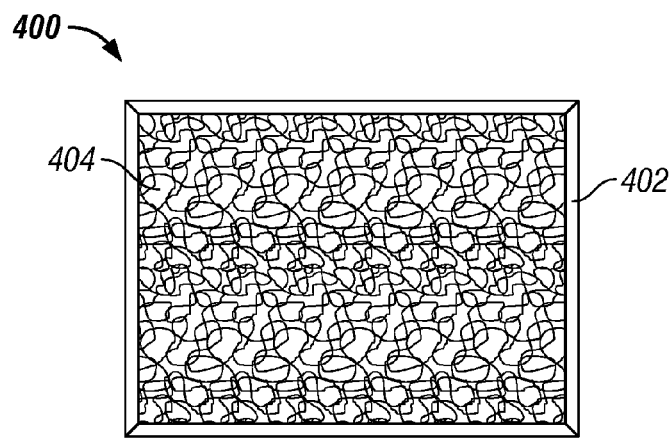
FIG. 4A
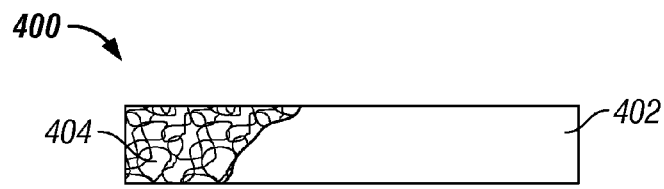
FIG. 4B

METHOD AND APPARATUS FOR REMOVING CONTAMINATES FROM AIR

CROSS REFERENCE TO RELATED APPLICATIONS

This is application claims benefit of and priority to U.S. provisional application Ser. No. 60/802,774, filed on May 24, 2006, the contents and disclosure of which are incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to induced or forced air filtration; and more specifically related to a system for removing contaminants from air used to ventilate an equipment room on an offshore drilling rig.

2. Description of the Related Art

In the drilling industry, drilling fluids, such as drilling mud, which may be a mixture of clay, water, and various additives, are pumped down through the drill string into the well. The drilling fluid exits the drill string at the bottom through holes or jets in a drill bit. The fluid picks up cuttings and other solids from the well and carries them away from the bit and out of the well in the annulus between the well and the drill string.

Once the drilling fluid is returned to the surface, equipment, such as mud pits and shakers, are used to remove large amounts of coarse, drilling cuttings from the drilling fluids so that the drilling fluids may be reused or recirculated within the well. The cuttings are generally filtered out of the drilling fluid on a series of filters or screens provided within the shaker. The drilling fluid that has passed through the equipment is now clean of coarse debris and is ready to be cleaned via other processes prior to being ready for reuse.

On offshore drilling rigs, where area or space is a precious commodity, the equipment is typically located below the main work deck in an enclosed area. Drilling fluids typically contain a measure of volatile organic compounds and fugitive contaminants from the drilling process. Because of this, the enclosed room is subject to forced ventilation to remove unpleasant and/or hazardous fumes. Depending on where the fumes are vented on the rig and the various and changing environmental conditions, the fumes may infiltrate other workspaces on the rig.

The inventions disclosed and taught herein are directed to a filter system for removing or reducing equipment room contamination of ventilation air.

BRIEF SUMMARY OF THE INVENTION

In one aspect of the invention, a filter assembly is provided comprising a housing having an air inlet and an air outlet and a filter chamber disposed between the inlet and the outlet, the housing having an air flow path there through. A filter element having a first surface area maybe located within the filter chamber and oriented such that the first surface area is angled with respect to the air flow path. The filter element may comprise a filter media adapted to remove fluid and/or solid contaminants from the air. A drain may be associated with the housing and adapted to remove fluid contaminants filtered out of the air.

BRIEF DESCRIPTION OF THE SEVERAL VIEWS OF THE DRAWINGS

FIGS. 3A and 3B illustrate another embodiment of a filter assembly according to the present invention.

FIGS. 4A and 4B illustrate a preferred embodiment of a filter element.

DETAILED DESCRIPTION

Figure 1:
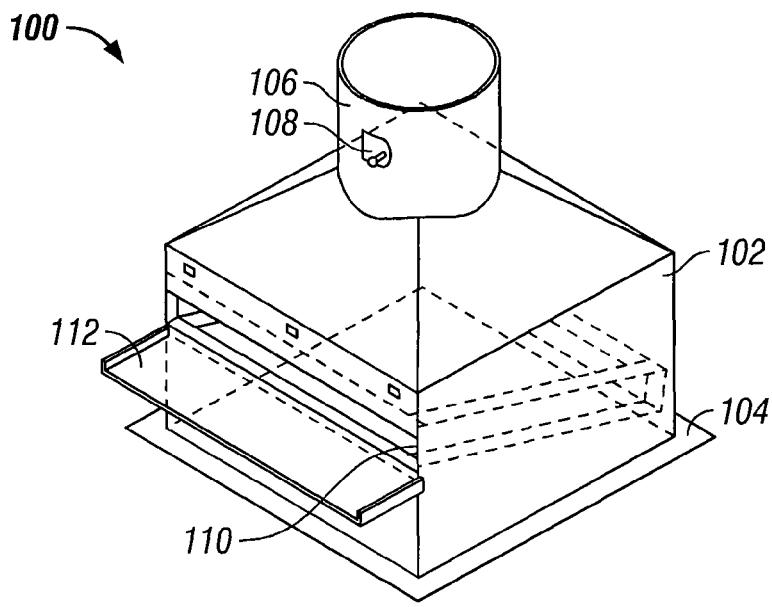
FIG. 1 illustrates a first embodiment of filter assembly according to the present invention.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created an air filtering system particularly, but not exclusively, suited for use on a mobile offshore drilling rig. Particular areas of application include the area typically identified as the mud pit room or shale shaker room. The invention comprises a mist eliminator filter adapted to collect or filter contaminant-laden mist associated with the oil base and synthetic base mud used in the drilling process as the drilling mud circulates through the mud pits or shale shakers.

The filter system may be designed as a single unit; however, it can be used in multiple unit installations wherein a number of such units become part of a ventilation system, each unit connected by ducting, and collectively exhausted by a fan up to the main deck and/or overboard of the rig. The filter assembly may incorporate multiple moisture separating filters in parallel by adding modules in the event the airflow volume is above the recommended flow rate for a single filter. The invention contemplates that the filter elements will be removable and be oriented at an angle within the unit to cause the collected materials to drain back into the mud pit or shale shaker.

When used in conjunction with the connecting ducting and exhaust fan, a negative pressure may be held in the mud pit room or under the shale shaker hood. The invention eliminates the exposure of personnel to the potentially toxic, explosive, and slippery oil and synthetic base fumes and residue that would otherwise be present in the general working areas of the mud pit room or shale shaker room, or adjacent the discharge of the ventilation air.

Turning now to a detailed description of several embodiments, FIG. 1 is an illustration of one of many embodiments of a filter assembly, according to the present invention. Filter assembly 100 may comprise a housing 102, adapted to contain one or more filter elements, as will be described below. As illustrated in FIG. 1, housing 102 has a flange 104 associated therewith and adapted to couple the filter assembly 100 to existing ductwork or equipment. A downstream portion 106 of housing 102 may comprise a damper assembly 108 for adjusting the air velocity there through.

As illustrated in FIG. 1, housing 102 comprises an opening 110, adapted to slidingly receive a filter element (not shown). The housing 102 also comprises a door 112, adapted to seal the opening 110 during use of the filter assembly 100. In the embodiment illustrated in FIG. 1, the door is hinged to the housing 102, such that when the door is open, it provides a landing area to facilitate insertion and extraction of the filter element.

Figure 2:
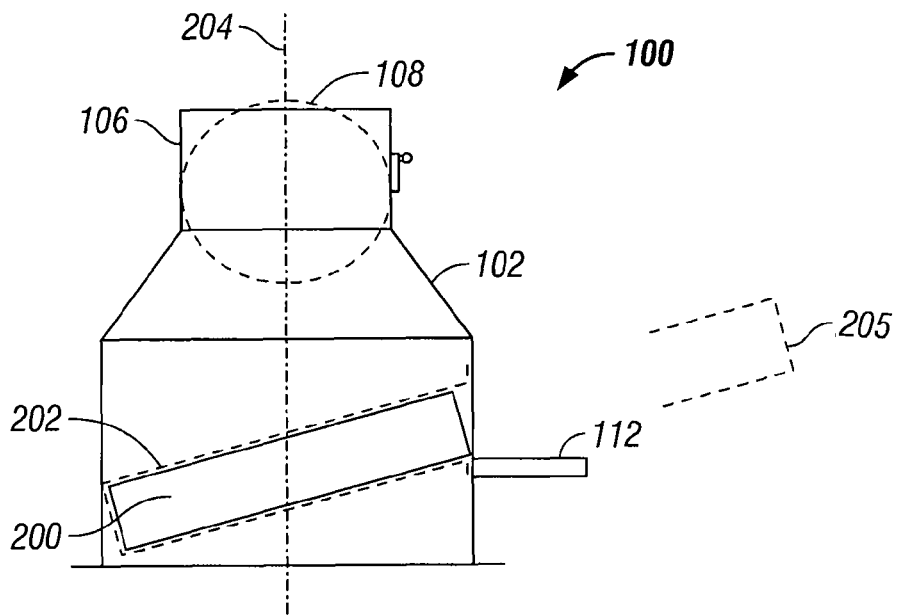
FIG. 2 illustrates a cross-sectional side view of the filter assembly shown in FIG. 1.

Turning now to FIG. 2, a cross-sectional side view of the filter assembly illustrated in FIG. 1 is shown. In FIG. 2, the filter element 200 is shown positioned in the housing 102. Guide rails 202 are located within the housing 102 and provide support and orientation for filter element 200. As will be appreciated from FIG. 2, it is preferred that the filter element 200 be oriented at an angle relative to an axis 204 of the filter assembly 100. In the embodiment of FIGS. 1 and 2, it is preferred that the filter be oriented at between 10° and 25° relative to axis 204 and, most preferably, at an angle of 15°. In addition to increasing the usable filter element 200 size, this angular orientation allows collected contaminants to drain to the lower-most point of the filter element 200, which may then be collected and returned to the shaker or mud pit system.

Also shown in FIG. 2 by phantom line 205 is the filter element 200 during extraction and insertion into filter housing 102. It will be appreciated that filter assembly 100 needs to be spaced adequately from surrounding equipment or other structures to allow removal and insertion of filter element 200.

Turning now to FIGS. 3A and 3B, these figures illustrate a filter assembly 300, adapted for horizontal airflow systems. FIG. 3A illustrates an over-all view of filter assembly 300, which comprises a housing 302. Horizontal airflow is illustrated by arrow 304. FIG. 3B shows the filter assembly 300 in cross-sectioned side view. Filter assembly 300 may comprise multiple filter elements 306, 308, and 310. Each filter element is shown to be separated from the other by a partition 312, 314. In this way, the inflow of air is partitioned into three substantially equal components, which flow through an associated filter element 306, 308, and 310. In the embodiment shown in FIGS. 3A and 3B, the filter elements 306, 308, and 310 are angled with respect to the horizontal airflow axis 304 as described previously, and preferably, at an angle of about 15°.

Also shown in FIG. 3B is drain 316, which allows for the collection and extraction from filter assembly 300 of collected contaminants. In the preferred embodiment, drain 316 is a coupling adapted to join with piping or other tubular components for return to shaker or mud-pit equipment. Although not shown in FIG. 3A or 3B, it will be appreciated that filter assembly 300 may comprise one or more doors to allow for the insertion and removal of filter elements 306, 308, and 310.

FIGS. 4A and 4B illustrate a filter element 400, suitable for use with the present invention. Filter element 400 may comprise a frame 402, adapted to support the filter media 404. The frame 402 may be fabricated from any of a number of suitable materials including metal, metal alloys, fiberglass, and composite. Depending on the environment in which the filter is to be used, temperature and/or corrosion may play a significant role in selecting the frame material. For most implementations, it is preferred that frame 402 be fabricated from stainless steel.

Filter media 404 may comprise any of a well-known number of media adapted to remove entrained contaminants, whether liquid or solid, such as hydrocarbons and drilling mud residue, from the air to be filtered. It is preferred that filter media 404 be washable and re-usable. For example, filter media made from metals, such as stainless steel or galvanized steel, or fiberglass are preferred. For embodiments used in shaker rooms or mud-pit rooms on mobile offshore drilling rigs, it is preferred that filter media be steel screen media, most preferably stainless steel, such as Farr Company's ECO line, single stage of moisture separators. Contrary to the recommendations of the Farr Company, it is preferred that the filter element 400 be oriented in angular fashion as described herein. It is preferred to design the filter assembly with an air velocity through the filter element 400 of between about 450 to 550 feet per minute. As the filter media 404 traps entrained fluids, entrained solids are also trapped.

Figure 5:
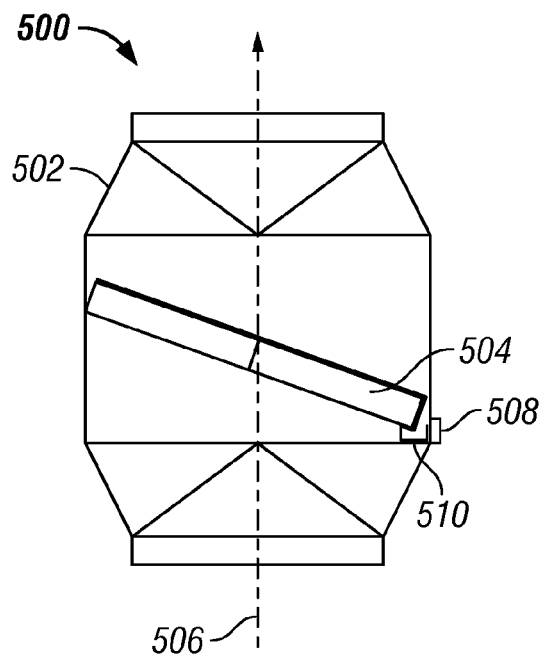
FIGS. 5 through 7 illustrate additional embodiments of filter assemblies according to the present invention.
Figure 6:
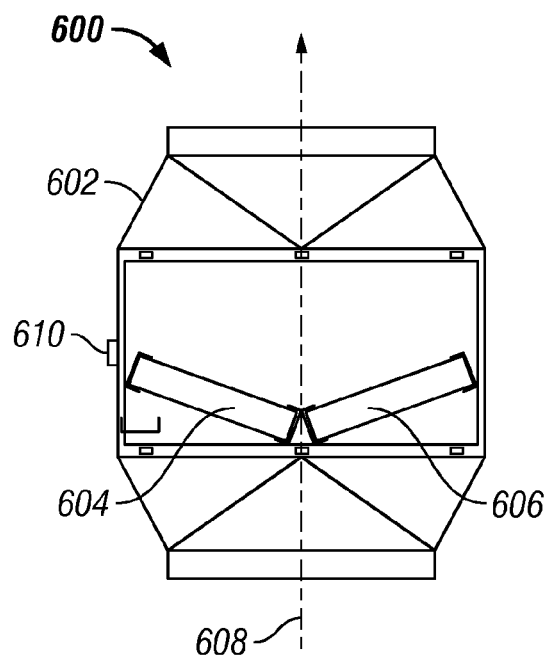
Figure 7:
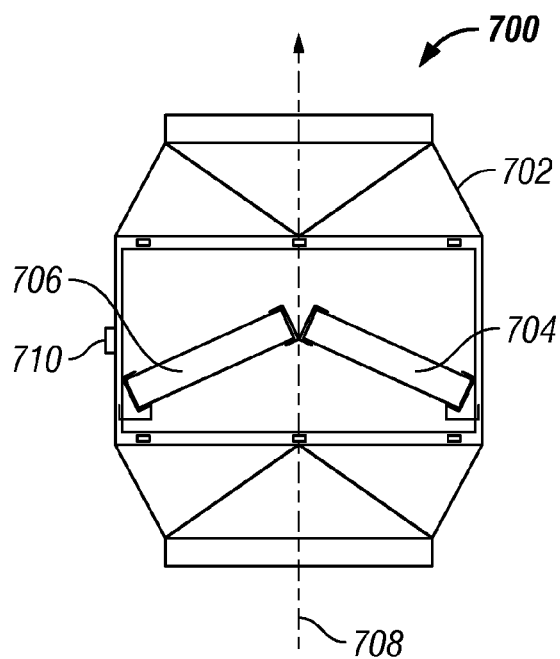

FIGS. 5, 6, and 7 illustrate additional embodiments on the basic filter assembly shown in FIGS. 3A and 3B. Filter assembly 500 shown in FIG. 5 comprises a housing 502 and a single filter element 504, oriented at an angle relative to airflow 506. Filter assembly 500 also comprises a drain 508 and associated drain channel 510.

FIG. 6 illustrates filter assembly 600, which comprises housing 602. Filter assembly 600 may also comprise two filter assemblies 604 and 606, angled relative to airflow 608 and each other. Filter assembly 600 also comprises drain 610.

FIG. 7 illustrates filter assembly 700, which comprises housing 702 and filter elements 704 and 706. Similar to the filter arrangement in FIG. 6, the filters in FIG. 7 are also angled relative to the airflow 708 and each other. A drain 710 is also provided.

Figure 8:
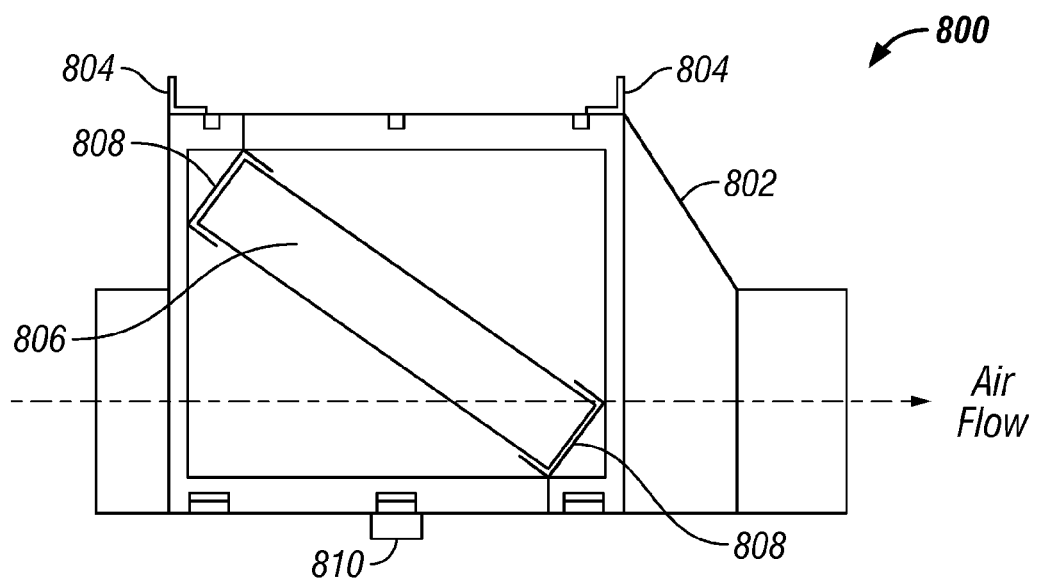
FIG. 8 illustrates a cross-sectional side view of yet another embodiment of a filter assembly according to the present invention.

Turning to FIG. 8, another filter assembly 800 is shown. The filter assembly 800 comprises a housing 802, having an air inlet and an air outlet. The housing 802 may also comprise lifting lugs 804 to facilitate installation of the filter assembly. Filter element 806 is shown disposed within housing 802 and oriented at an angle with a respect to the airflow. The filter element 806 is held in place by channel guides 808, which are coupled to the housing 802. Housing 802 is provided with a drain 810 as has been described previously. It will be appreciated that filter element 806 can be inserted and removed from housing 802 by sliding the filter element 806 in and out of guide rails 808. Although not shown in this view, it will be appreciated that a door (not shown) is used to seal the housing 802, once the filter 806 is in place.

Figure 9:
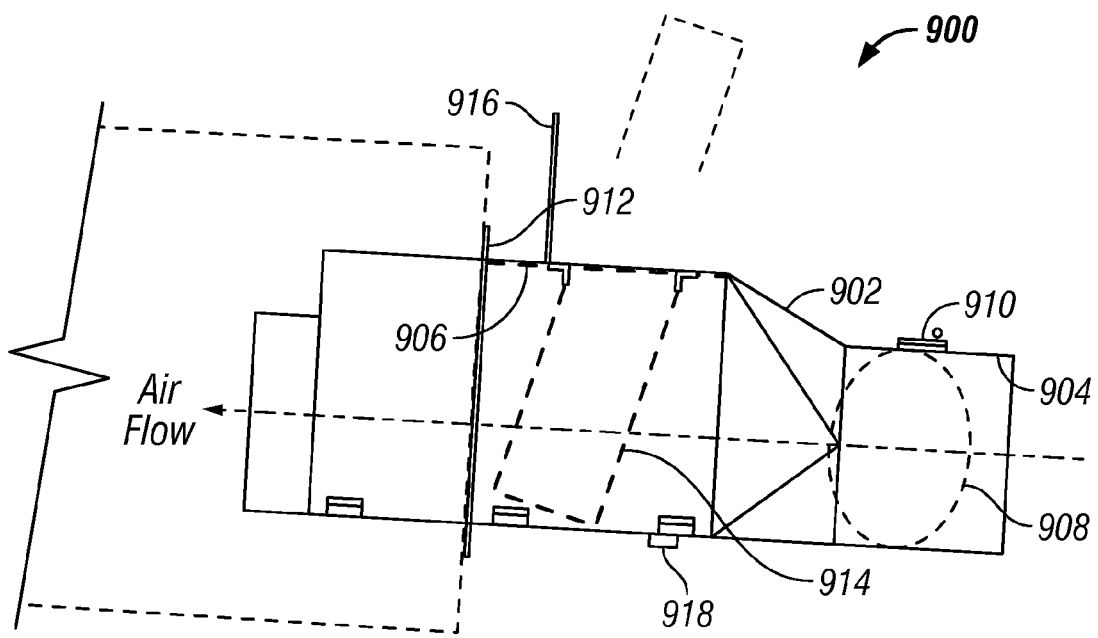
FIG. 9 illustrates a cross-sectional side view of another embodiment of a filter assembly according to the present invention.

FIG. 9 illustrates another embodiment of the filter assembly 900. Filter assembly 900 comprises a housing 902, having an inlet 904 and an outlet 906. Associated with the inlet 904 may be a damper 908 with a manual damper control 910. Outlet 906 may comprise a flange 912 or other structure for mounting the filter assembly 900 to additional ductwork. Housing 902 comprises a filter element guide and support system 914, adapted to receive and support a filter element (not shown). Housing 902 also comprises a door 916, to effectively seal the filter element in the housing 902 during use. As illustrated in FIG. 9, the filter element is oriented at an angle with respect to airflow to allow efficient drainage and collection of contaminants. As described previously, housing 902 may comprise a drain 918 to extract collected contaminants from housing 902.

Figure 10:
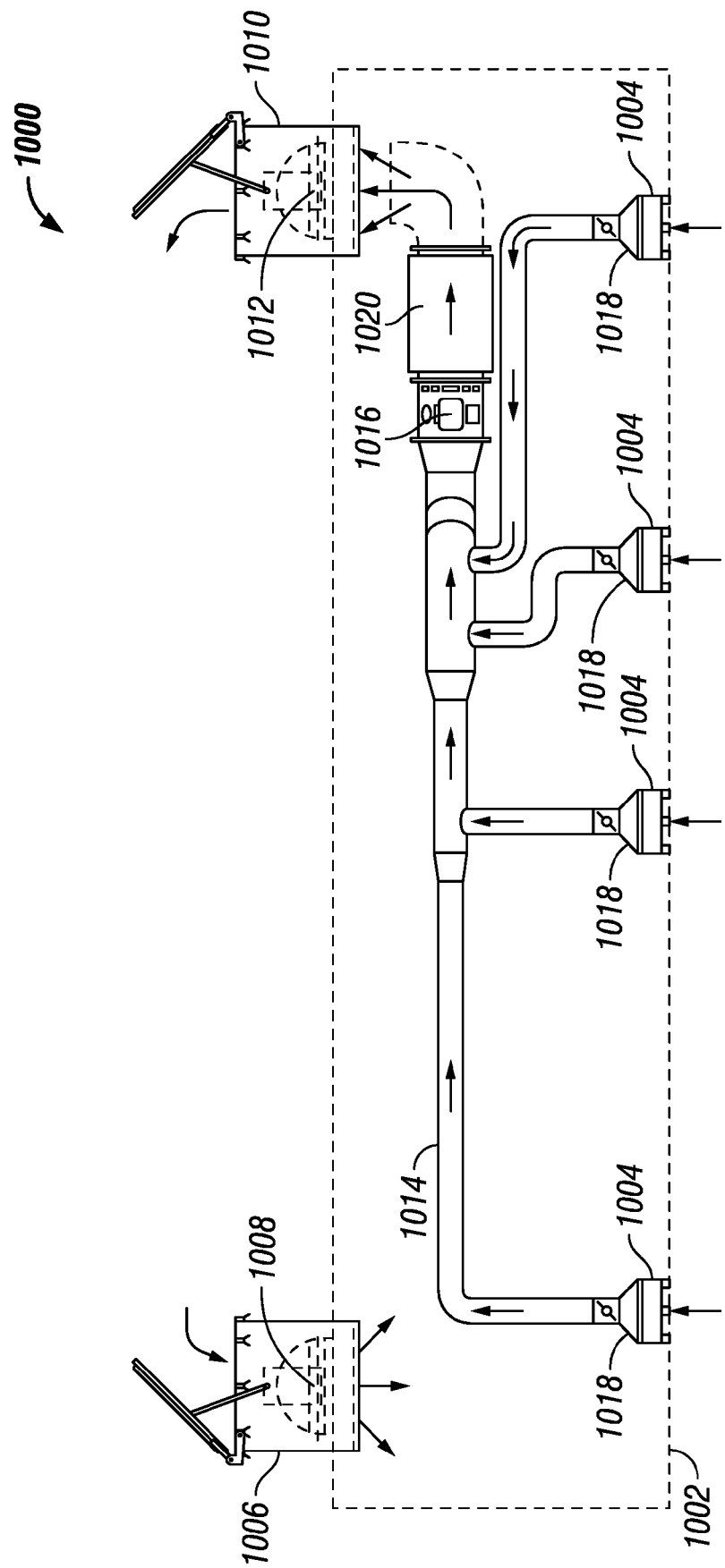
FIG. 10 illustrates a typical enclosed mud pit room with multiple filter assemblies according to the present invention.

FIG. 10 illustrates one of many implementations of filter assemblies according to the present invention on a mobile offshore drilling rig. An enclosed space 1002 is outfitted with equipment, such as drilling mud pits 1004. Forced ventilation of enclosed space 1002 is provided by an air inlet 1006 comprising a fan or blower 1008 and associated equipment. An air outlet 1010 from the enclosed space 1002 is provided with a fan or blower 1012 and associated equipment.

Equipment ventilation system 1014 comprises ductwork and fan or blower 1016. It will be appreciated that, to the extent that pits 1004 produces fumes, vapors, or other fluid associated with the material it is processing, such as drilling fluids, equipment ventilation system 1014 will disburse those entrained fluids out of outlet 1010. However, use of filter assemblies 1018 associated with each pit 1004 will remove such entrained fluid from the equipment ventilation system 1014 and disburse relatively clean air through outlet 1010. In addition, associating a filter assembly 1018 with each piece of equipment, allows the fluid removed from the entrained air to be returned to the equipment from whence it came.

Alternately, one of more silencers 1020 may be associated with the equipment ventilation system 1014 to help reduce the ventilation noise, as may be required.

Multiple embodiments of a filter assembly, according to the present invention, have now been described. It will be appreciated by those of skill in the art that design details such as the volume of air to be filtered, the degree of contamination of the air to be filtered, and the working environment will require site-specific modifications and design changes to the embodiments described. The housing and related components can be fabricated from almost any material including metals, metal alloys, fiberglass, and composites. It is presently preferred that the filter assembly housing and related equipment be fabricated from stainless steel. Damper assemblies may be associated with the inlet or outlet of the filter assemblies as required or desired and may be controlled manually or automatically.

Other and further embodiments utilizing one or more aspects of the inventions described above can be devised without departing from the spirit of Applicant's invention. Further, the various methods and embodiments of the air filter assembly can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A filter assembly for removing contaminants from air vented from a work area surrounding a contaminant source, the filter assembly comprising:
    a housing having an air inlet, an air outlet and a filter chamber disposed between the inlet and the outlet, the housing having an air flow path there through between the inlet and the outlet;
    a filter element having a first surface area
    and a filter media adapted to filter contaminants from the air;
    a drain associated with the housing and adapted to remove contaminants filtered out of the air;
    a filter opening in the housing adapted to facilitate insertion and removal of the filter element;
    a door configured to seal the opening while air is flowing along the air flow path;
    wherein the filter element is oriented within the filter chamber so that the first surface area is angled with respect to the air flow path and so that filtered contaminants move toward a collection location; and
    wherein the filter assembly is adapted to collect the filtered contaminants and return the filtered contaminants to the contaminant source.

2. The filter assembly of claim 1, further comprising an air damper associated with the air inlet or the air outlet.

3. The filter assembly of claim 2, wherein the air damper is associated with the air inlet.

4. The filter assembly of claim 2, wherein the air damper is associated with the air outlet.

5. The filter assembly of claim 2, wherein the air damper is controlled manually or automatically.

6. The filter assembly of claim 1, wherein the filter media is adapted to be cleaned and reused.

7. The filter assembly of claim 1, wherein the filter element is adapted to be cleaned and reused.

8. The filter assembly of claim 1, further comprising a plurality of filter elements.

9. A method of ventilating equipment in a closed space, comprising:
    providing a ventilation system to extract air from the closed space, the ventilation system comprising a fan, associated duct work and at least one filter assembly as claimed in claim 1 disposed in fluid communication with the duct work between the closed space and an atmosphere surrounding the closed space;
    allowing air to flow through the at least one filter assembly, thereby removing at least some fluid from the air; and returning the fluid removed from the air to equipment from whence it came.

10. The method of claim 9, wherein the ventilation system further comprises an air damper associated with the air inlet or the air outlet.

11. The method of claim 10, wherein the air damper is associated with the air inlet.

12. The method of claim 10, wherein the air damper is associated with the air outlet.

13. The method of claim 10, further comprising controlling the air damper manually or automatically.

14. The method of claim 9, wherein the filter media is adapted to be cleaned and reused.

15. The method of claim 9, wherein the filter element is adapted to be cleaned and reused.

16. The method of claim 9, wherein the at least one filter assembly further comprises a plurality of filter elements.

17. The filter assembly of claim 1, wherein the door is hingedly coupled to the housing and configured to provide a landing area when the door is open.

18. A ventilation system for ventilating equipment in an enclosed space, comprising:
 at least one conduit having an air inlet in fluid communication with the enclosed space and an air outlet in fluid communication with an atmosphere surrounding the enclosed space;
 an air mover fluidicly coupled with the conduit and adapted to move air from the inlet to the outlet; and
 at least one filter assembly as claimed in claim 1 fluidicly coupled with the conduit between the enclosed space and the outlet of the conduit.

19. The ventilation system of claim 18, further comprising:
 a plurality of conduits fluidicly coupled between the enclosed space and the atmosphere; and
 having a plurality of said at least one filter assemblies, each filter assembly being fluidicly coupled to one of the plurality of conduits.

20. The filter assembly of claim 1, further comprising:
 an air flow axis passing centrally through the outlet perpendicular to a cross-sectional plane of the outlet; and
 wherein the first surface area of the filter element intersects the air flow axis at an angle other than 90 degrees.

21. The filter assembly of claim 20, wherein the angle is between about 10 degrees and about 25 degrees.

22. The filter assembly of claim 21, wherein the angle is about 15 degrees.

23. The filter assembly of claim 1, wherein the filtered contaminants include liquid.

* * * * *